United States Patent
Ikeda et al.

(10) Patent No.: US 6,467,807 B2
(45) Date of Patent: Oct. 22, 2002

(54) STEERING DEVICE FOR CAR

(75) Inventors: Shuhei Ikeda; Kenji Sato; Katsumi Saito; Sakae Matsumoto, all of Maebashi (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/782,523

(22) Filed: Feb. 14, 2001

(65) Prior Publication Data

US 2001/0019205 A1 Sep. 6, 2001

(30) Foreign Application Priority Data

| Feb. 15, 2000 | (JP) | 2000-036936 |
| Apr. 4, 2000 | (JP) | 2000-102693 |
| Aug. 24, 2000 | (JP) | 2000-254210 |
| Oct. 12, 2000 | (JP) | 2000-312118 |

(51) Int. Cl.[7] .................. B62D 1/18
(52) U.S. Cl. .................. 280/775; 280/777; 74/493
(58) Field of Search .................. 280/775, 776, 280/777; 74/492, 493

(56) References Cited

U.S. PATENT DOCUMENTS

| 4,475,744 A | * 10/1984 | Leutz ................. 280/775 |
| 4,481,838 A | * 11/1984 | Findley et al. .......... 280/775 |
| 4,633,732 A | * 1/1987 | Nishikawa et al. ....... 280/775 |
| 5,009,121 A | * 4/1991 | Matsumoto et al. ...... 280/775 |
| 5,090,730 A | * 2/1992 | DuRocher et al. ....... 280/775 |
| 5,439,252 A | * 8/1995 | Oxley et al. ........... 280/775 |
| 5,520,416 A | * 5/1996 | Singer et al. .......... 280/775 |
| 5,527,068 A | * 6/1996 | Schneider ............. 280/775 |
| 5,555,772 A | * 9/1996 | Schneider ............. 280/775 |
| 5,606,892 A | * 3/1997 | Hedderly ............. 280/775 |
| 5,711,189 A | * 1/1998 | Cartwright et al. ..... 280/775 |
| 5,813,289 A | * 9/1998 | Renick et al. ......... 280/775 |
| 5,820,163 A | * 10/1998 | Thacker et al. ........ 280/775 |
| 5,845,936 A | * 12/1998 | Higashino ........... 280/775 |
| 5,979,938 A | * 11/1999 | Menjak et al. ........ 280/775 |
| 6,019,391 A | * 2/2000 | Stuedemann et al. ... 280/775 |
| 6,167,777 B1 | * 1/2001 | Snell ................. 280/775 |
| 6,189,405 B1 | * 2/2001 | Yazane ............... 180/444 |
| 6,324,935 B1 | * 12/2001 | Schoen et al. ........ 188/371 |

FOREIGN PATENT DOCUMENTS

| GB | 2 116 496 | 9/1983 |
| JP | 58-45171 | 10/1983 |
| JP | 60-36513 | 10/1985 |
| JP | 3-128564 | 12/1991 |
| JP | 8-80857 | 3/1996 |
| JP | 11-278283 | 10/1999 |

* cited by examiner

*Primary Examiner*—Paul N. Dickson
*Assistant Examiner*—Deanna Draper
(74) *Attorney, Agent, or Firm*—Crowell & Moring LLP

(57) ABSTRACT

A steering device for a car comprises an inner column for rotatably supporting one end of a steering shaft, an outer column for rotatably supporting the other end of the steering shaft, in which the inner column is slidably fitted, a couple of clamp portions formed integrally with the outer column and each having an embracing surface for embracing the inner column, and a fastening mechanism for making the couple of clamp portions embrace and thus fasten the inner column by moving the couple of clamp portions close to each other. The steering shaft is moved in the axial direction by releasing the fastening mechanism so that a telescopic position of the steering shaft is adjustable.

8 Claims, 22 Drawing Sheets

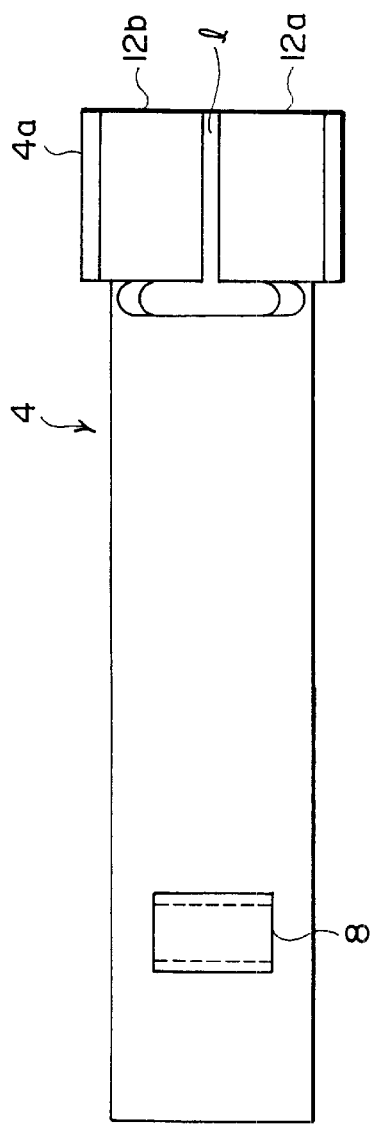
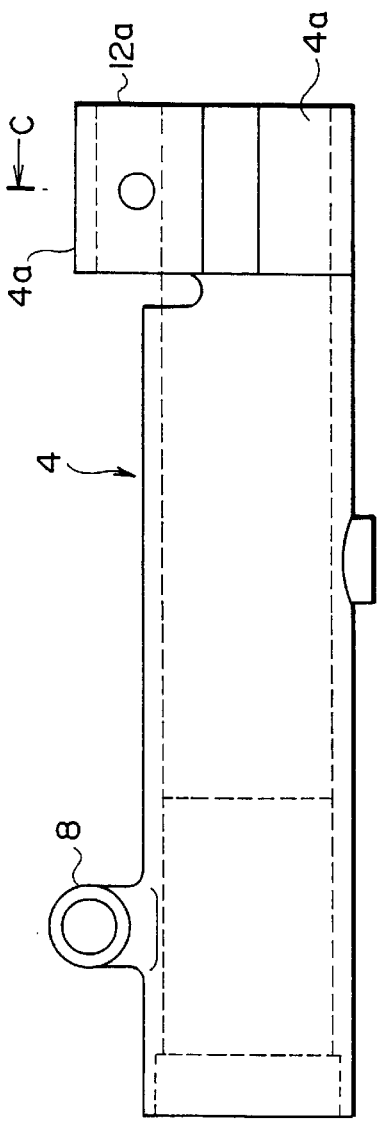
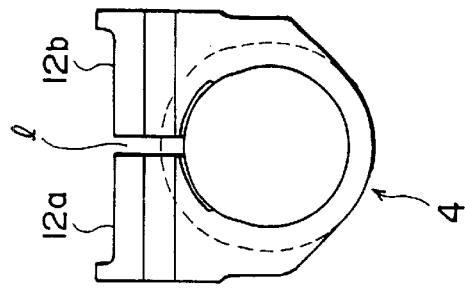
FIG. 5A
FIG. 5B
FIG. 5C

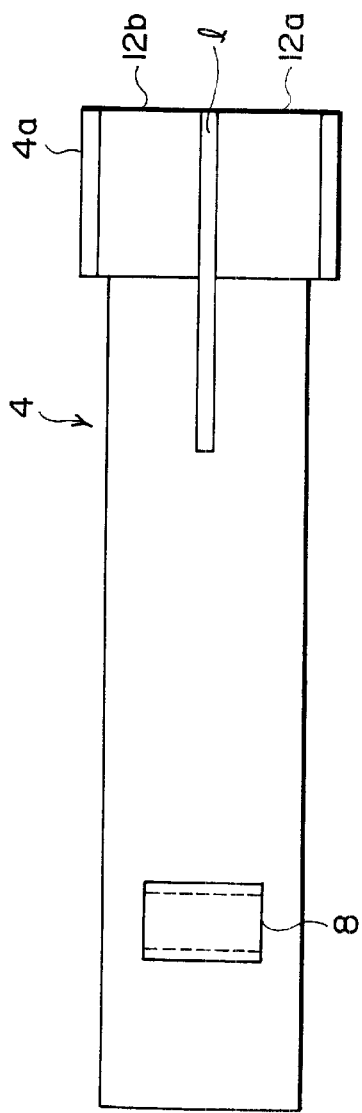
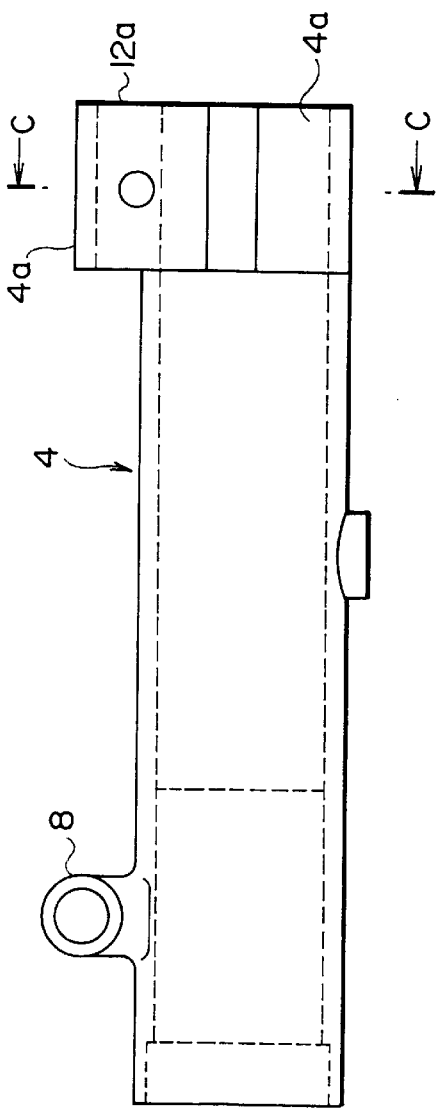
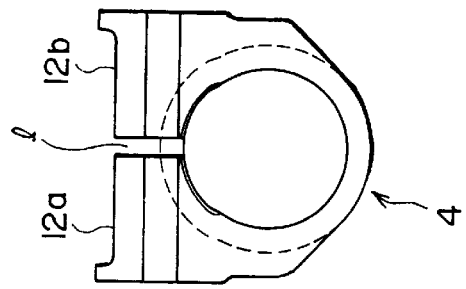

STEERING DEVICE FOR CAR

This application claims the benefit of Japanese Patent Applications No. 2000-36936, 2000-102693, 2000-254210 and 2000-312118 which are hereby incorporated by reference.

BACKGROUND OF THE INVENTION

1. Field of the Invention

The present invention relates generally to a steering device for a car, and more particularly to a steering device for a car, which is capable of adjusting a tilt angle of a steering shaft and/or an axial position of the steering shaft.

2. Related Background Art

One of the steering devices for cars is a tilt telescopic type steering device capable of adjusting a tilt angle of a steering wheel and also adjusting an axial position of the steering wheel.

For example, in the tilt telescopic type steering device disclosed in Japanese Patent Application Laid-Open No.11-278283, an upper-sided inner column is slidably inserted into a lower-sided outer column. This upper-sided inner column is fitted with a distance bracket formed with a telescopic adjustment groove. This distance bracket is structured to come into contact with the inside of a car-body-sided bracket having a tilt adjustment groove. A fastening bolt is inserted through the telescopic adjustment groove and the tilt adjustment groove. An operation lever is fitted to one side end of this fastening bolt.

With this construction, when the operation layer is opearated, the fastening bolt moves in the axial direction, thereby releasing the fastening of the car-body-sided bracket and the distance bracket. Then, the fastening bolt moves in up-and-down direction along the tilt adjustment groove, whereby a tilt angle of the upper-sided inner column can be adjusted and an axial position thereof can be adjusted with an axial movement of the inner column along the telescopic adjustment groove.

After making the tilt and telescopic adjustments, when the operation lever is opearated in the opposite direction, the fastening bolt is moved in the axial direction and presses the car-body-sided bracket against the distance bracket. The upper-sided inner column can be thereby fastened in the state after making the tilt and telescopic adjustments. Further, both of the tilt adjustment and the telescopic adjustment can be thus made by operating one single operation lever.

In the tilt telescopic type steering device disclosed in the Publication given above, the upper-sided inner column is slidably fitted in the lower-sided outer column, thereby enhancing rigidities of the two columns.

The upper-sided inner column is not, however, necessarily directly clamped against the lower-sided outer column, and hence, if a bending load acts on the steering wheel (i.e., if the steering wheel is wrenched in the up-and-down directions), the upper-sided inner column might be moved with slight oscillations, and it can not necessarily be said that the rigidities of the two columns are high.

Note that the rigidities are, it may also be considered, increased by providing a plurality of reinforcing plates on the distance bracket provided in the upper-sided inner column, however, there might be a possibility in which manufacturing costs rise due to an increase in the number of components.

SUMMARY OF THE INVENTION

It is a primary object of the present invention to provide a steering device for a car that is capable of adjusting a tilt and/or telescopic position with enhanced rigidity of a steering column.

To accomplish the above object, according to one aspect of the present invention, a steering device for a car, comprises an inner column for rotatably supporting one end of a steering shaft, an outer column, for rotatably supporting the other end of the steering shaft, in which the inner column is slidably fitted, a couple of clamp members formed integrally with the outer column and each having an embracing surface for embracing the inner column, and a fastening member for making the couple of clamp members embrace and thus fasten the inner column by moving the couple of clamp members close to each other. The steering shaft is movable in the axial direction by releasing the fastening by the fastening member, and a telescopic position of the steering shaft thereby is adjustable.

In the steering device for the car, preferably the outer column is rotatably supported on the car body, and a tilt position of the steering shaft is adjustable when releasing the fastening by the fastening member.

According to another aspect of the present invention, a steering device for a car, comprises an inner column for rotatably supporting one end of a steering shaft, an outer column, for rotatably supporting the other end of the steering shaft, in which the inner column is slidably fitted, a couple of clamp members made by a casting process, disposed along an outer periphery of the outer column and each having an embracing surface for embracing the inner column, and a fastening member for making the couple of clamp members embrace and thus fasten the inner column by moving the couple of clamp members close to each other. The steering shaft is movable in the axial direction by releasing the fastening by the fastening member, and a telescopic position of the steering shaft thereby is adjustable.

As described above, in the steering device for the car, the inner column is directly clamped by the outer column. With this structure, even when the bending load acts on the steering wheel (i.e., when the steering wheel is wrenched in the up-and-down directions), the inner column neither moves nor oscillates slightly, and the rigidities of the two columns can be highly increased.

BRIEF DESCRIPTION OF THE DRAWINGS

FIG. 5A is a plan view showing a lower-sided outer column in the first embodiment; FIG. 5B is a side view of this outer column; FIG. 5C is a cross-sectional view taken along the line C—C in FIG. 5B;

FIG. 8A is a plan view showing the lower-sided outer column in a third modification of the first embodiment of the present invention; FIG. 8B is a side view of this outer column; FIG. 8C is a cross-sectional view taken along the line C—C in FIG. 8B;

DESCRIPTION OF THE PREFERRED EMBODIMENTS

A tilt telescopic type steering device for a car in an embodiment of the present invention will hereinafter be described with reference to the accompanying drawings.

(First Embodiment)

Figure 1:
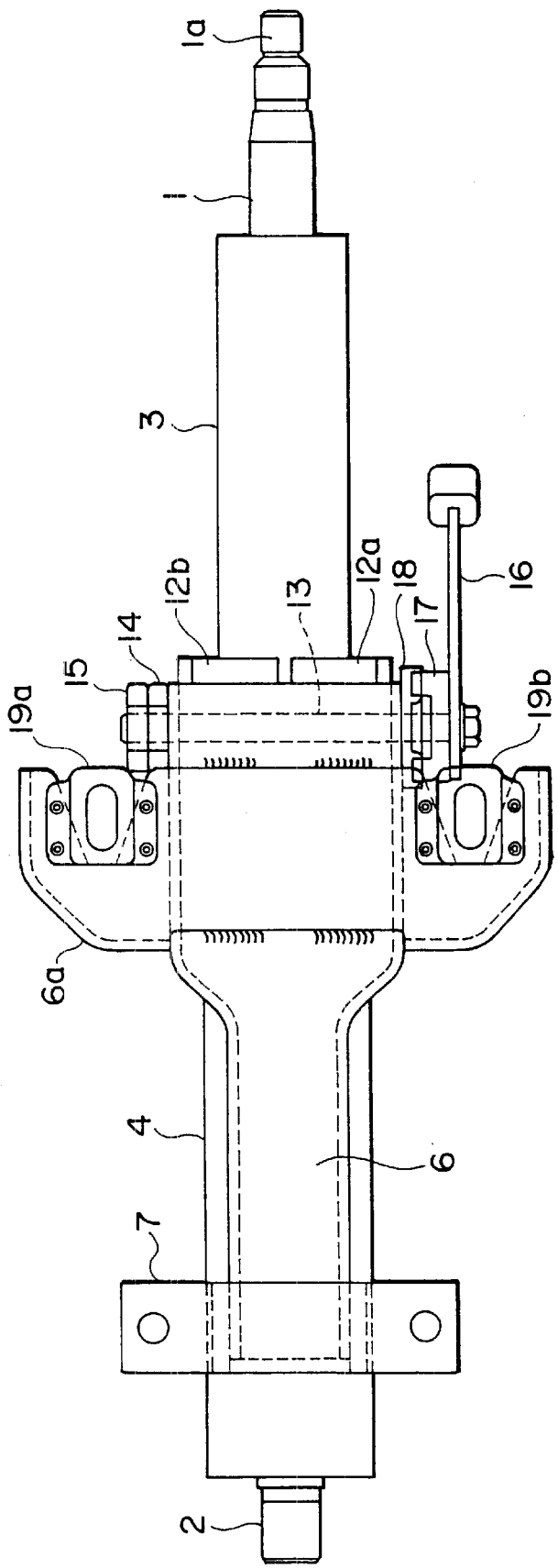
FIG. 1 is a plan view showing a tilt telescopic type steering device for a car in a first embodiment of the present invention.
Figure 2:
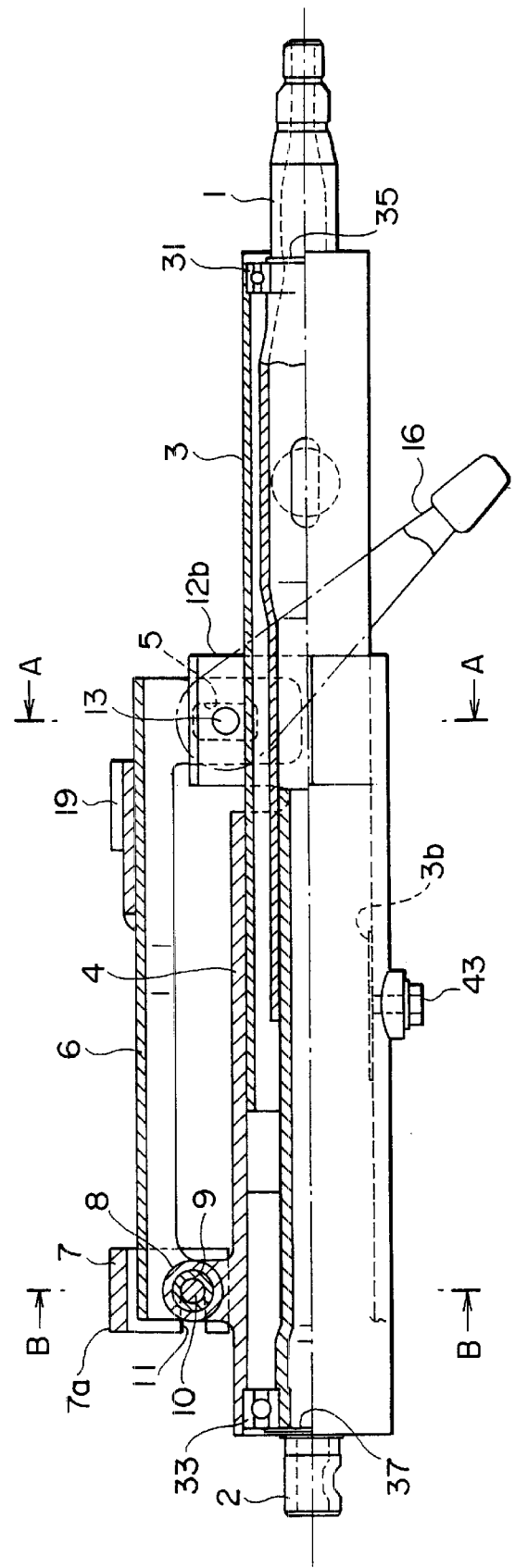
FIG. 2 is a longitudinal vertical sectional view of the steering device shown in FIG. 1.
Figure 3:
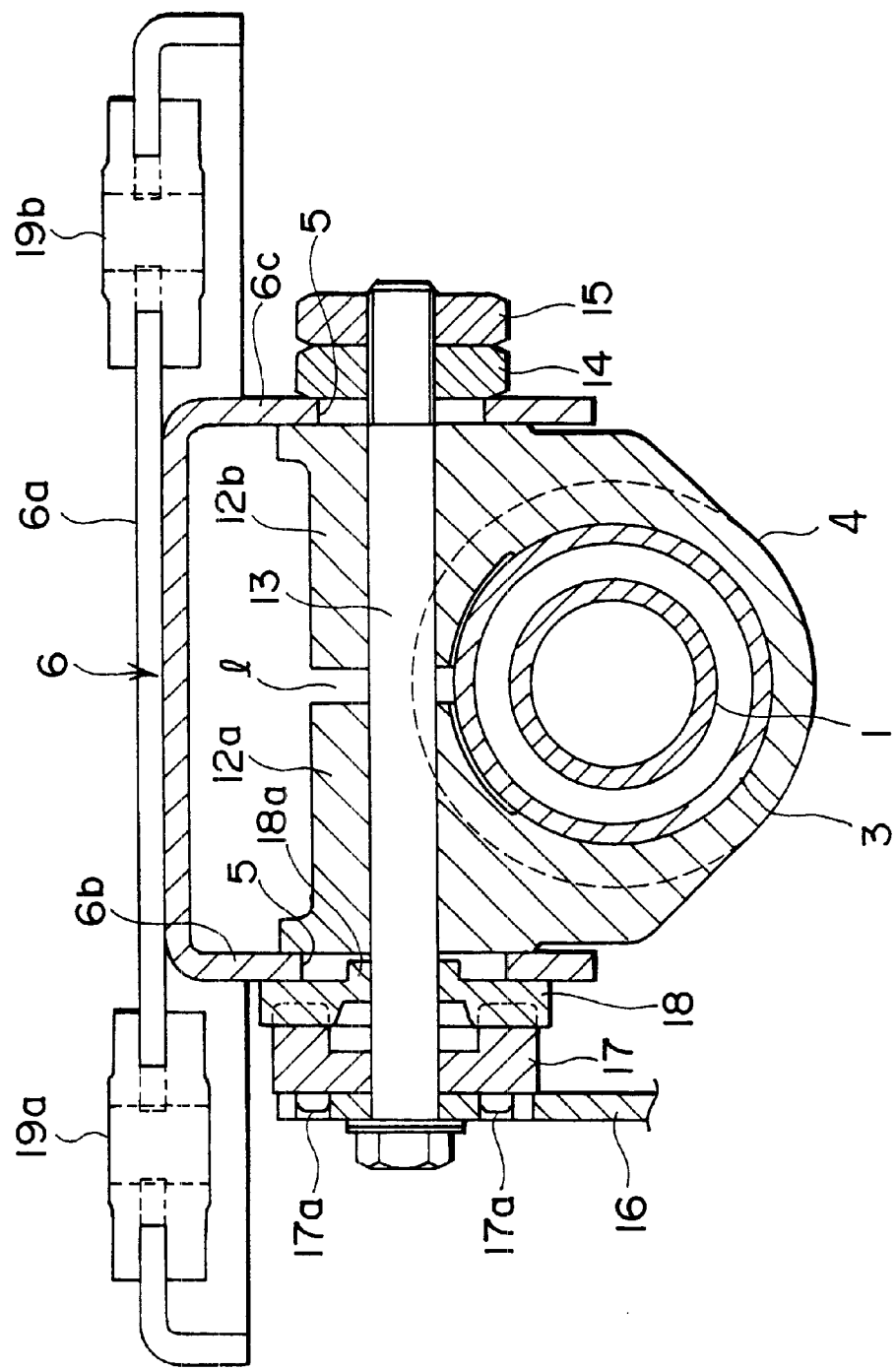
FIG. 3 is a cross-sectional view taken along the line A—A in FIG. 2.
Figure 4:
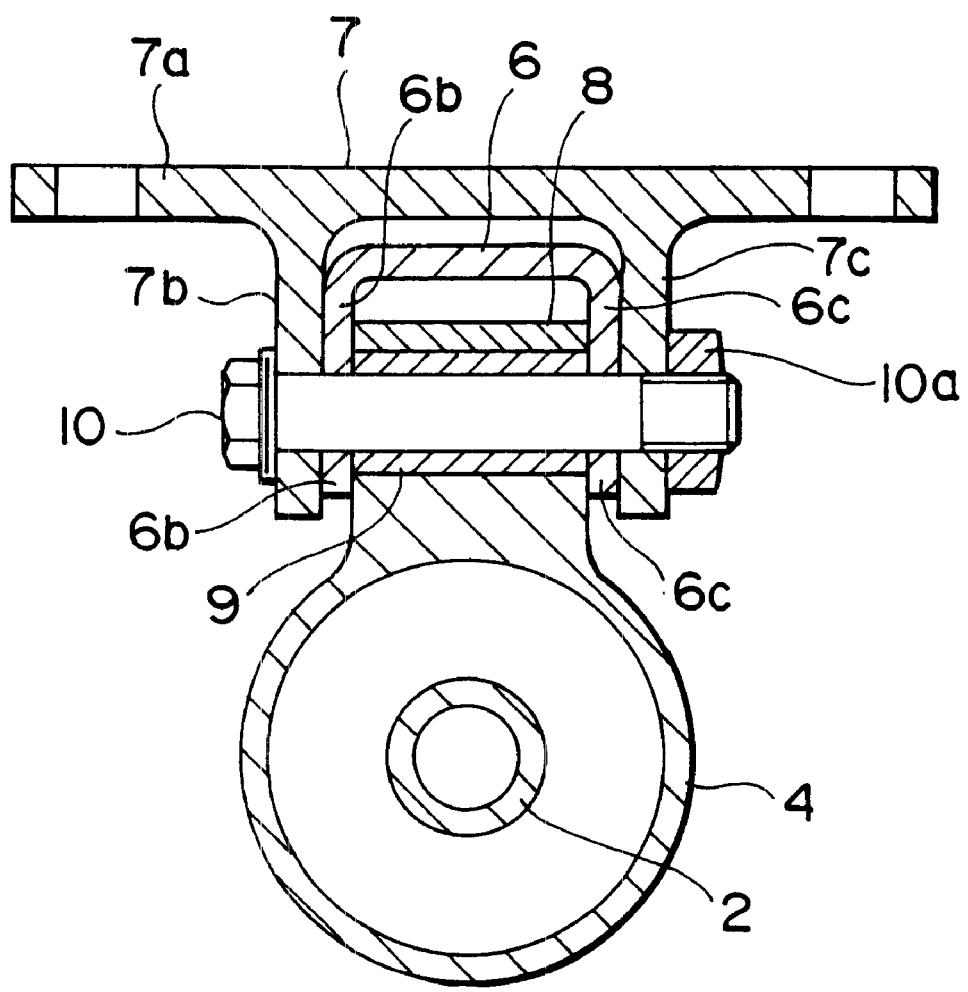
FIG. 4 is a cross-sectional view taken along the line B—B in FIG. 2.

FIG. 1 is a plan view showing a tilt telescopic type steering device for a car in a first embodiment of the present invention. FIG. 2 is a longitudinal vertical sectional view showing the steering device shown in FIG. 1. FIG. 3 is a cross-sectional view taken along the line A—A in FIG. 2. FIG. 4 is a cross-sectional view taken along the line B—B in FIG. 2. FIG. 5A is a plan view of a lower-sided outer column. FIG. 5B is a side view of this outer column. FIG. 5C is a cross-sectional view taken along the line C—C in FIG. 5B.

As shown in FIGS. 1 and 2, a steering shaft is, in an extensible/compressible manner, constructed of an upper shaft 1 for fixedly supporting a steering wheel (unillustrated) at a rear side end portion of the car, and a lower shaft 2 spline-fitted to this upper shaft 1. The steering column is slidably constructed of an upper-sided inner column 3 for rotatably supporting the upper shaft 1 at an upper side end through a ball bearing 31, and a lower-sided outer column 4 that rotatably supports the lower shaft 2 at a lower side end through a ball bearing 33 and is fitted on the upper-sided inner column 3. The upper shaft 1 is provided with a slip-in preventive C-ring 35 for preventing the upper shaft 1 from slipping into the inner column 3. Further, the lower shaft 2 is provided with a slip-in preventive C-ring 37 for preventing the lower shaft 2 from slipping into the outer column 4.

A bracket 6 formed with tilt adjustment grooves 5 is, as shown also in FIGS. 3 and 4, provided along the periphery of the lower-sided outer column 4. The bracket 6 has a flange 6a to be connected to the car body on the rear side of the car, taking an inverted U-shape directed downwards on the whole. The bracket 6 is also formed integrally with opposed side plate members 6b, 6c.

As shown in FIG. 4, on the lower side of the ca-body-sided bracket 6, a separate lower bracket 7 is so provided as to embrace the car-body-sided bracket 6. The lower bracket 7 includes an upper plate member 7a to be connected to the car body, and an opposed side plate members 7b, 7c, directed downwards, for holding the opposed side plate members 6b, 6c of the bracket 6 in a way of coming into contact with these members 6b, 6c. A front end of the outer column 4 is formed integrally with a cylindrical member 8 so that two side ends thereof are in contact with the insides of the opposed side plate members 6b, 6c of the bracket 6. A tilt center bolt 10 is inserted through the opposed side plate members 7b, 7c of the lower bracket 7, the opposed side plate members 6b, 6c of the bracket 6 and the cylindrical member 8 via a spacer cylinder 9, and is fastened by a nut 10a. The lower-sided outer column 4 is thereby capable of tilting about this tilt center bolt 10. Note that the lower bracket 7 is, as shown in FIG. 2, formed with a come-off open slit 11 used for the tilt center bolt 10 to come off when collapsed upon a secondary collision.

Figure 7:
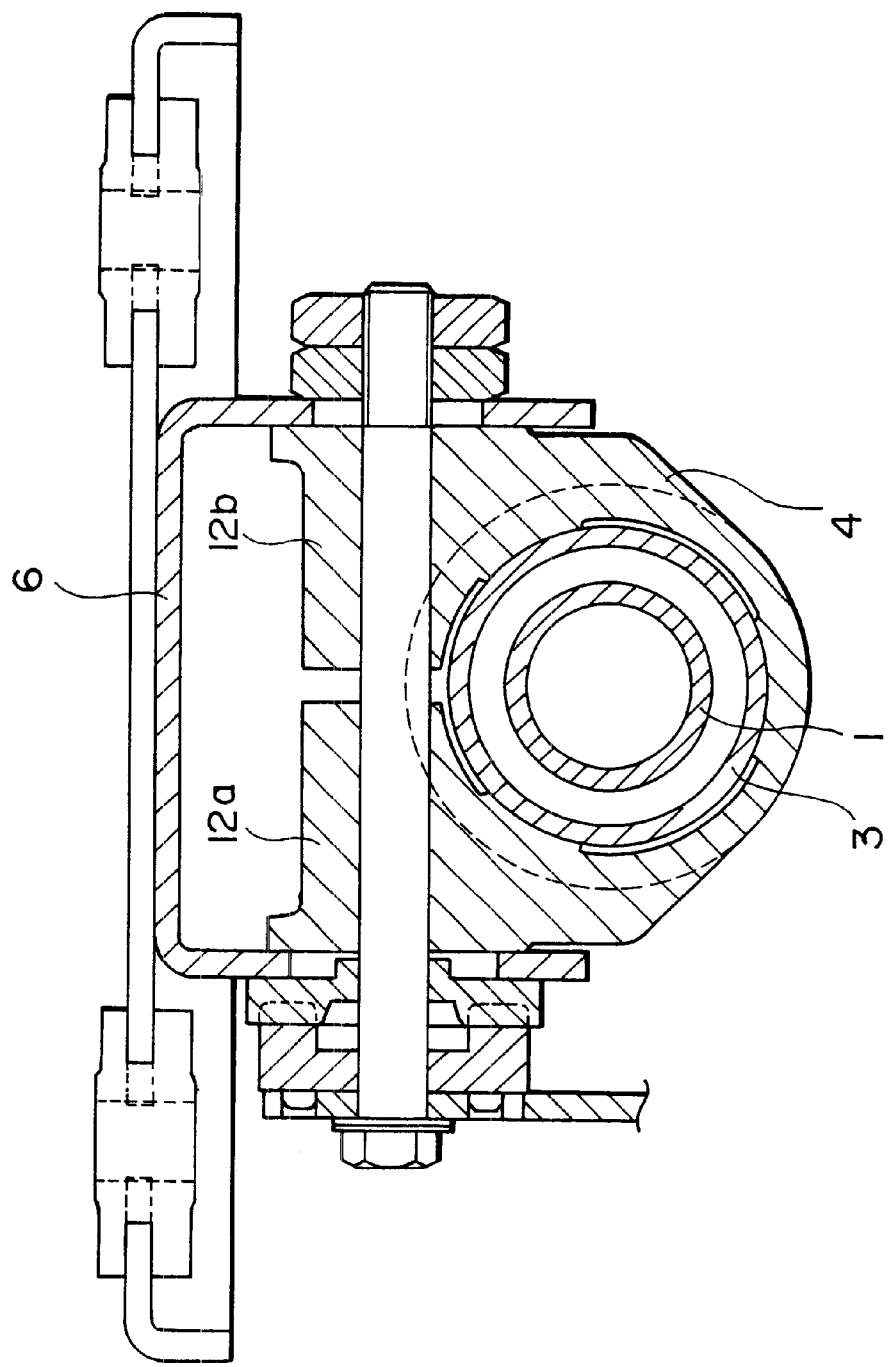
FIG. 7 is a sectional view similar to FIG. 3, showing a second modification of the first embodiment of the present invention.

The lower-sided outer column 4 extends backward up to such a position as to cover almost all the fitting portion between the upper shaft 1 and the lower shaft 2, and has integrally, on a more rear side than this fitting portion, an outer jacket member 4a over a range of a certain length. The outer jacket member 4a is formed with a slitting 1 extending in an axial direction at the center of an upper portion thereof. The outer jacket member 4a is also provided with a pair of clamp members 12a, 12b for clamping the upper- sided inner column 3 so as to hold this column 3. Each of the clamp members 12a, 12b has an inner peripheral surface taking a configuration suited to an outer peripheral surface of the inner column 3, and an outside surface in contact with the inside of the car body sided bracket 6. Note that the inner peripheral surface of each of the clamp members 12a, 12b be, it is desirable, brought in contact over 180° or greater in the peripheral direction with the outer peripheral surface of the inner column 3. Further, as shown in FIG.7, the inner peripheral surf ace thereof may be brought in contact therewith in at least three portions of the periphery. A fastening bolt 13 penetrates the clamp members 12a, 12b. A screw portion of this fastening bolt 13 is screwed into a fastening nut 14 and a lock nut 15 as well.

The head of this fastening bolt 13 is fitted with an operation lever 16 and is provided with a cam lock mechanism. This cam lock mechanism is constructed of a first cam member 17 rotating together with the operation lever 16, and a non-rotational second cam member 18 moving in the axial direction while engaging with a crest or bottom of the first cam member 17 with the rotation of this first cam member 17 and thus locking or unlocking. Note that the first cam member 17 is structured so that a protrusion 17a of the first cam member 17 is fitted to the operation lever, whereby the first cam member 17 is capable of rotating integrally with the operation lever 16. The second cam member 18 is structured so that a protrusion 18a of the second cam member 18 is fitted in the tilt adjustment groove 5, whereby the second cam member 18 is always kept incapable of rotation. Further, the flange 6a of the bracket 6 is provided with come-off capsules 19a, 19b used when collapsed upon the secondary collision. Namely, the bracket 6 is connected to the car body via the come-off capsules 19a, 19b.

With the construction described above, if the car collides, a steering shaft assembly consisting of the outer column 4, the inner column 3, the lower shaft 2 and the upper shaft 1, moves together with the bracket 6 forwardly of the car with respect to the lower bracket 7.

When making a tilt telescopic release, the operation lever 16 is rotated in a predetermined direction. Then, the first cam member 17 rotates simultaneously and engages with the bottom from the crest of the second cam member 18, and the second cam member 18 moves leftward in FIG. 3, thereby unlocking the car-body-sided bracket from the outer column 4.

With this operation, when making a tilt adjustment, the fastening bolt 13 is moved along the tilt adjustment grooves 5, and the outer column 4 and the inner column 3 are tilted with the tilt center bolt 10 being centered, thus making it possible to adjust the steering wheel (unillustrated) at a desired tilt angle.

When making a telescopic adjustment, the upper-sided inner column 3 is slid in the axial direction with respect to the lower-sided outer column 4, whereby the steering wheel (unillustrated) can be adjusted to a desired position in the axial direction. Note that a stopper bolt 43 facing inwards in a radial direction is provided at a protruded portion on the lower side of the outer periphery of the outer column 4. The inner column 3 has an elongate groove 3b having a predetermined length, which is formed facing to the stopper bolt 43. An inner side end of the stopper bolt 43 engages with this elongate groove 3b, thus becoming a telescopic position adjustment stopper as well as becoming a rotation preventive member.

When in a tilt telescopic fastening process, the operation lever 16 is rotated in the opposite direction, and simultaneously the first cam member 17 rotates and engages with the crest from the bottom of the second cam member 18, with the result that the second cam member 18 moves rightward in FIG. 3. Then, the car-body-sided bracket 6 presses the outer column 4 with the fastening bolt 13.

With this operation, the couple of these clamp members 12a, 12b move close to each other, and clamp the upper-sided inner column 3 so as to hold the same column 3. Thus, the upper-sided inner column 3 is clamped directly by the lower-sided outer column 4. With this configuration, even when a bending load acts on the steering wheel (not shown) (i.e., when the steering wheel (unillustrated) is wrenched in up-and-down directions), the upper-sided inner column 3 neither moves nor oscillates slightly, whereby rigidities of the two columns 3, 4 can be highly increased.

Figure 6A:
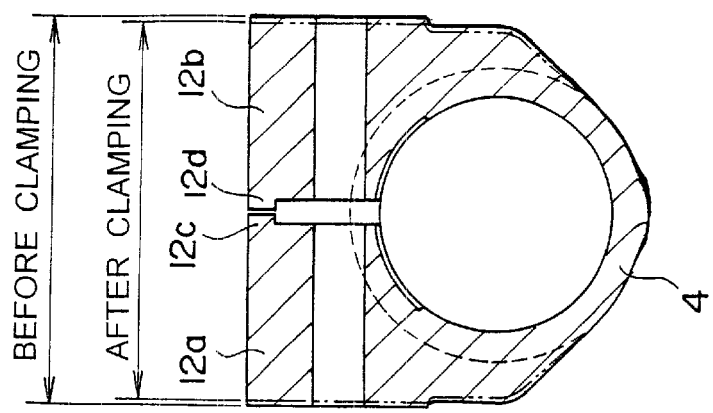
FIG. 6A is a sectional view showing the lower-sided outer column in the first embodiment.
Figure 6B:
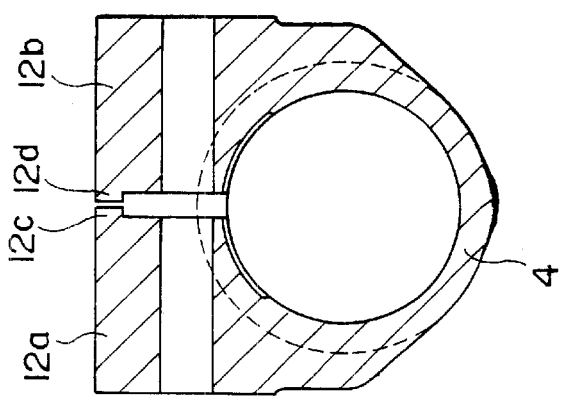
FIG. 6B is a sectional view of the lower-sided outer column in a modification of the first embodiment.
Figure 6C:
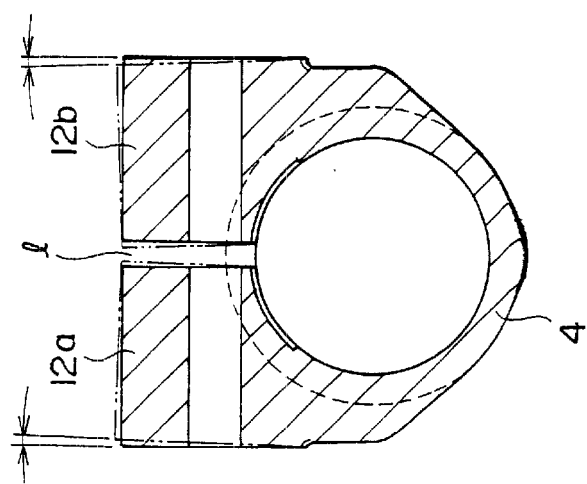
FIG. 6C is a cross-sectional view showing an operation of the lower-sided outer column in this modification.

FIG. 6A is a sectional view showing the lower-sided outer column in the first embodiment. FIG. 6B is a sectional view showing the lower-sided outer column in a modification of the first embodiment. FIG. 6C is a sectional view showing an operation of the lower-sided outer column in this modification.

As illustrated in FIG. 6A, in the first embodiment discussed above, at the portion formed with the [slitting 1] between the couple of clamp members 12a, 12b, a gap therebetween is too large, and a gap between the outer column 4 and the inner column 3 is large. In this case, there might be a possibility in which the couple of clamp members 12a, 12b are tilted when clamped.

For coping with this, as shown in FIGS. 6B and 6C, a couple of protrusions 12c, 12d are respectively provided at the portion formed with the [slitting] between the couple of clamp members 12a, 12b. With this configuration, when clamped, the couple of protrusions 12c, 12d come into contact with each other, and it is therefore feasible to keep the couple of clamp members 12a, 12b in parallel and to obtain a sufficient holding force.

FIG. 7 shows a second modification of the first embodiment. In the second modification, the outer periphery of the inner column 3 is brought into contact with the inner peripheries of the clamp members 12a, 12b at three areas disposed at equal angles. Note that the slitting 1 in the outer column 4 may, as shown in FIG. 8A, extend more forwards than in FIG. 5. Further, the outer column 4 may be composed of castings such as an aluminum casting, a zinc casting, a magnesium-series casting and an iron-series casting.

(Second Embodiment)

Figure 9:
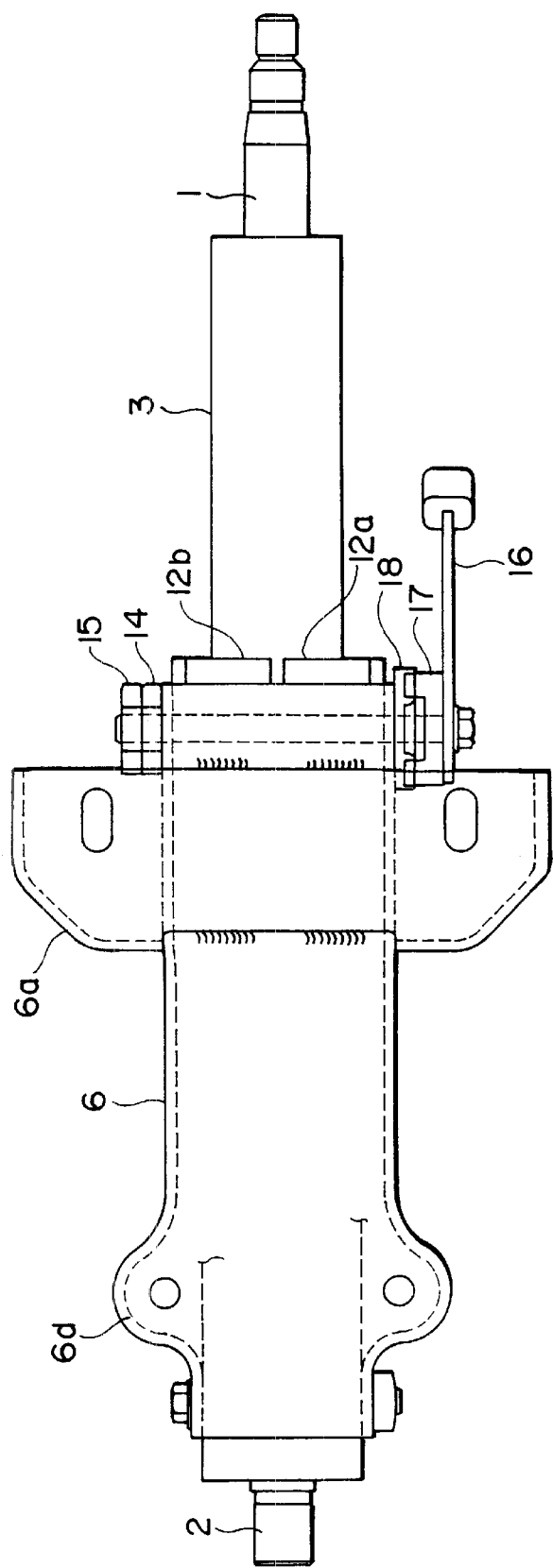
FIG. 9 is a plan view showing a tilt telescopic type steering device for a car in a second embodiment of the present invention.
Figure 10:
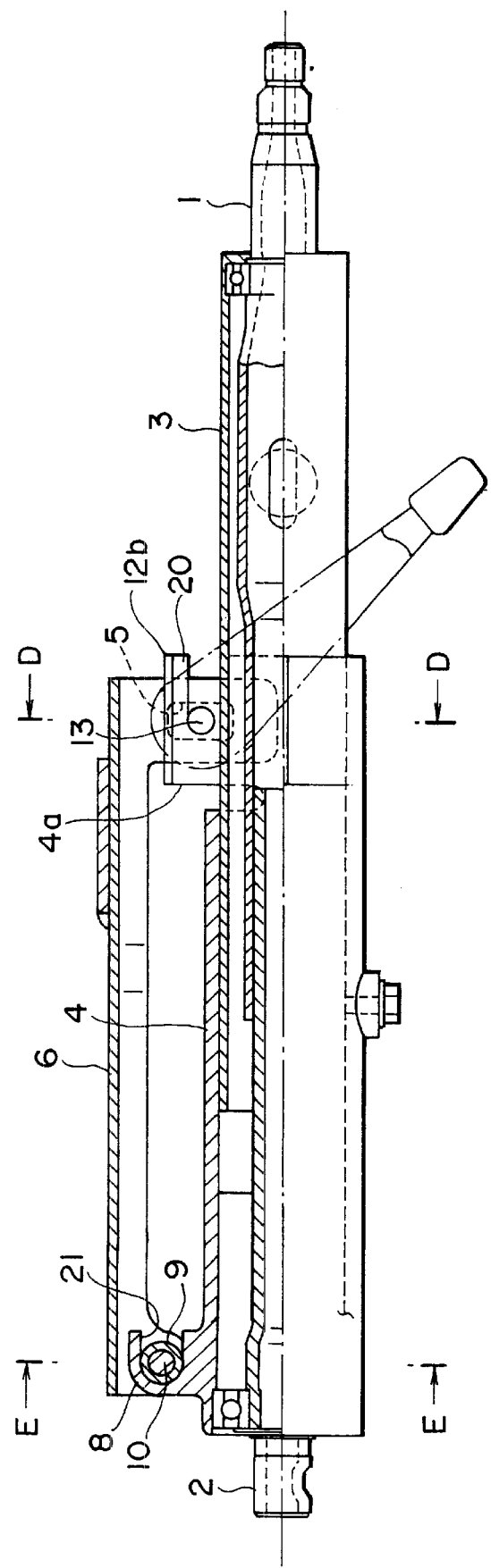
FIG. 10 is a vertical sectional view of the steering device shown in FIG. 9.
Figure 11:
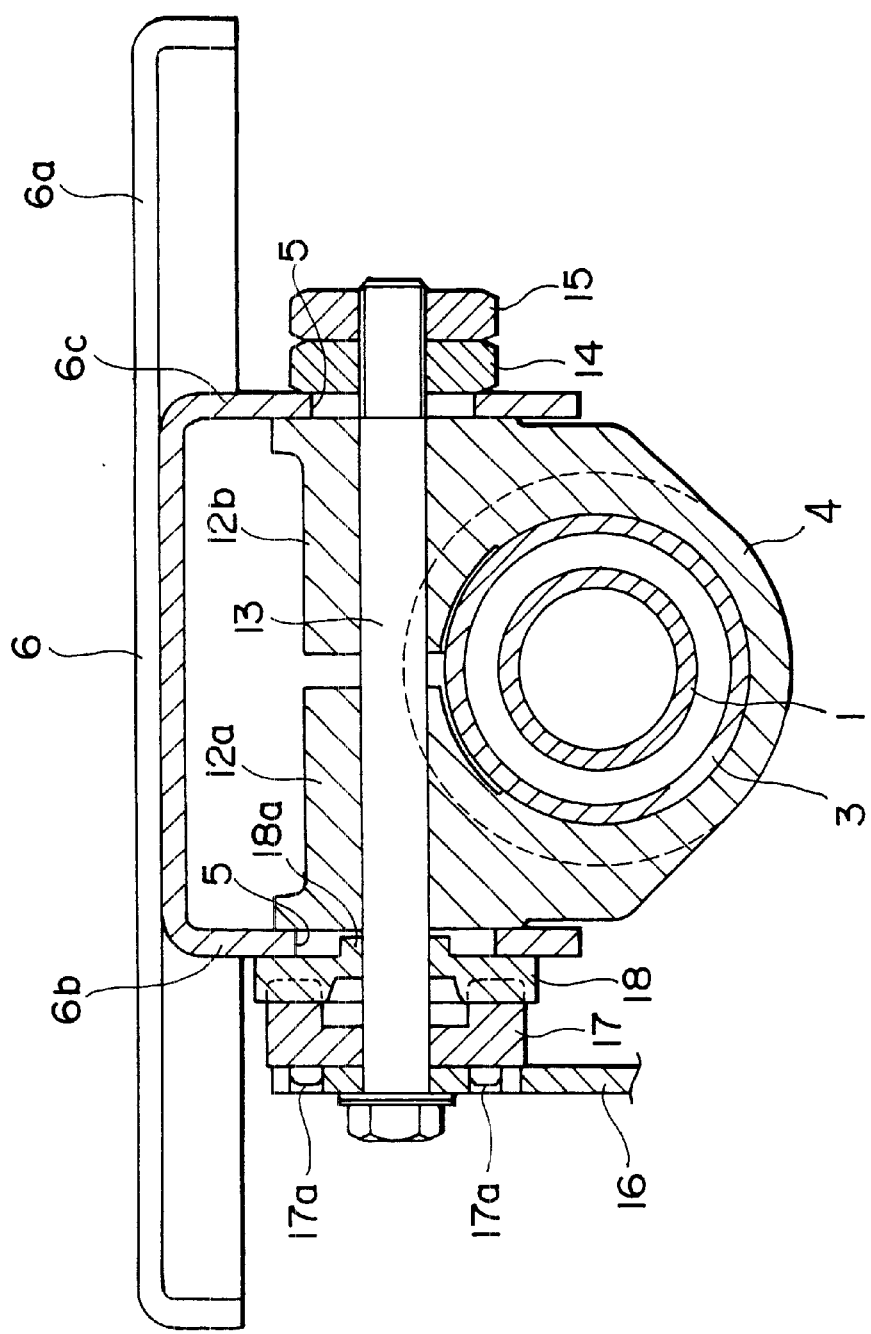
FIG. 11 is a cross-sectional view taken along the line D—D in FIG. 10.
Figure 12:
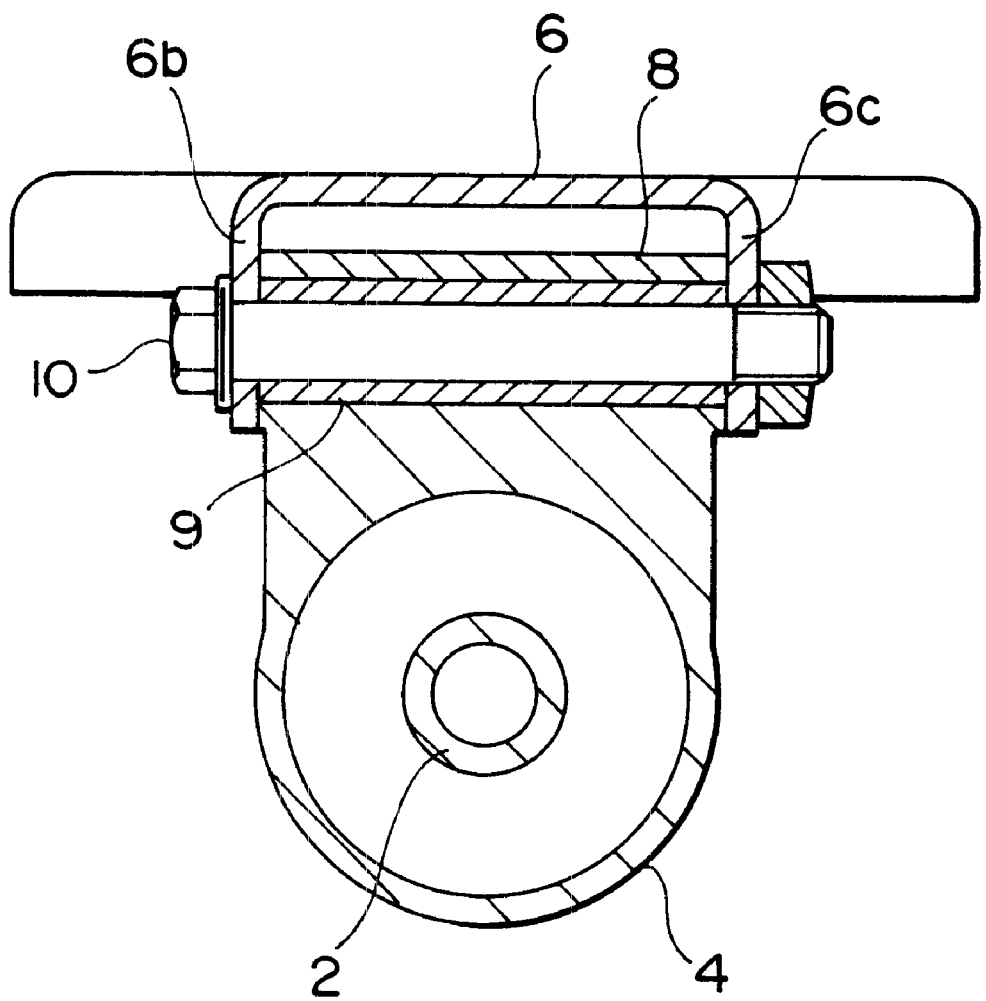
FIG. 12 is a cross-sectional view taken along the line E—E in FIG. 10.

FIG. 9 is a plan view of the tilt telescopic type steering device for the car in a second embodiment of the present invention. FIG. 10 is a longitudinal vertical sectional view of the steering device shown in FIG. 9. FIG. 11 is a cross-sectional view taken along the line D—D in FIG. 10. FIG. 12 is a cross-sectional view taken along the line E—E in FIG. 10.

The second embodiment uses a different come-off method when the secondary collision occurs and is substantially the same as the first embodiment discussed above other than the following configuration.

In the second embodiment, the bracket 6 includes a rear flange 6a on the rear side of the car and a front flange 6d as integral members. The bracket 6 is fixedly held on the car side by these flanges so as to be impossible of coming off when collided.

As shown in FIG. 10, a come-off oriented open slit 20 used for the fastening bolt 13 to come off when collapsed upon the secondary collision, is formed on the rear side of the fastening bolt 13 in the couple of clamp members 12a, 12b that configure the outer jacket 4a integrally formed with the outer column 4.

Further, on the side of the tilt center bolt 10, a hook 8 as a substitute for the cylindrical member in the first embodiment is formed integrally with the outer column 4. A come-off oriented open slit 21 used for the tilt center bolt 10 to come off when collapsed upon the secondary collision, is formed on the rear side of this hook 8.

In the second embodiment, upon the car collision, the steering shaft assembly consisting of the outer column 4, the inner column 3, the lower shaft 2 and the upper shaft 1, moves forwardly of the car with respect to the bracket 6 on the car side.

(Third Embodiment)

Figure 13:
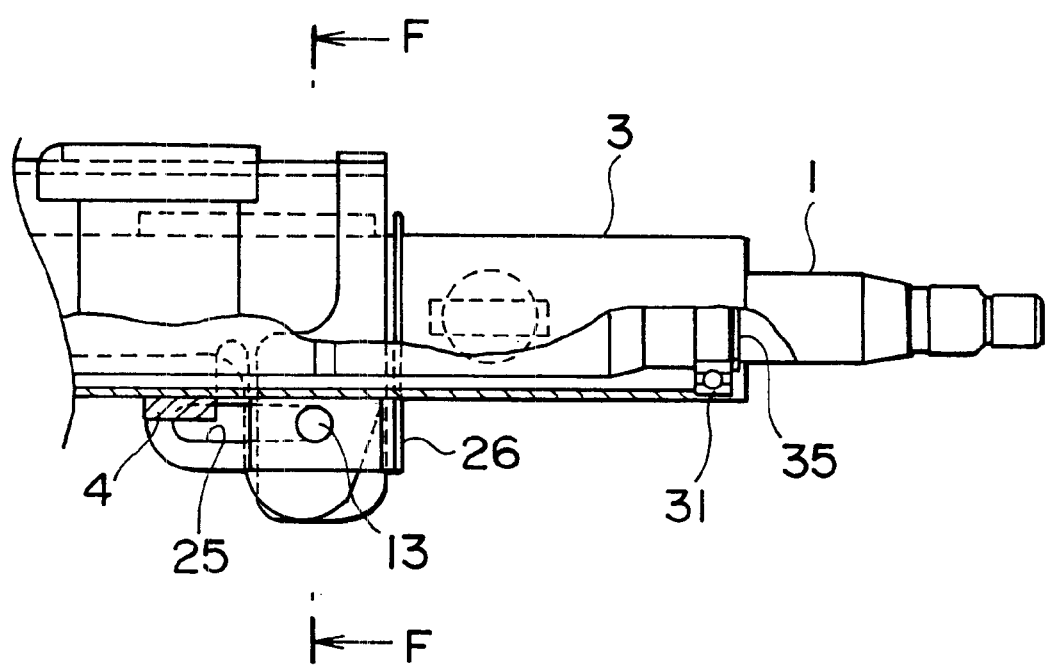
FIG. 13 is a partial sectional view showing principal components of the tilt telescopic type steering device for the car in a third embodiment of the present invention.
Figure 14:
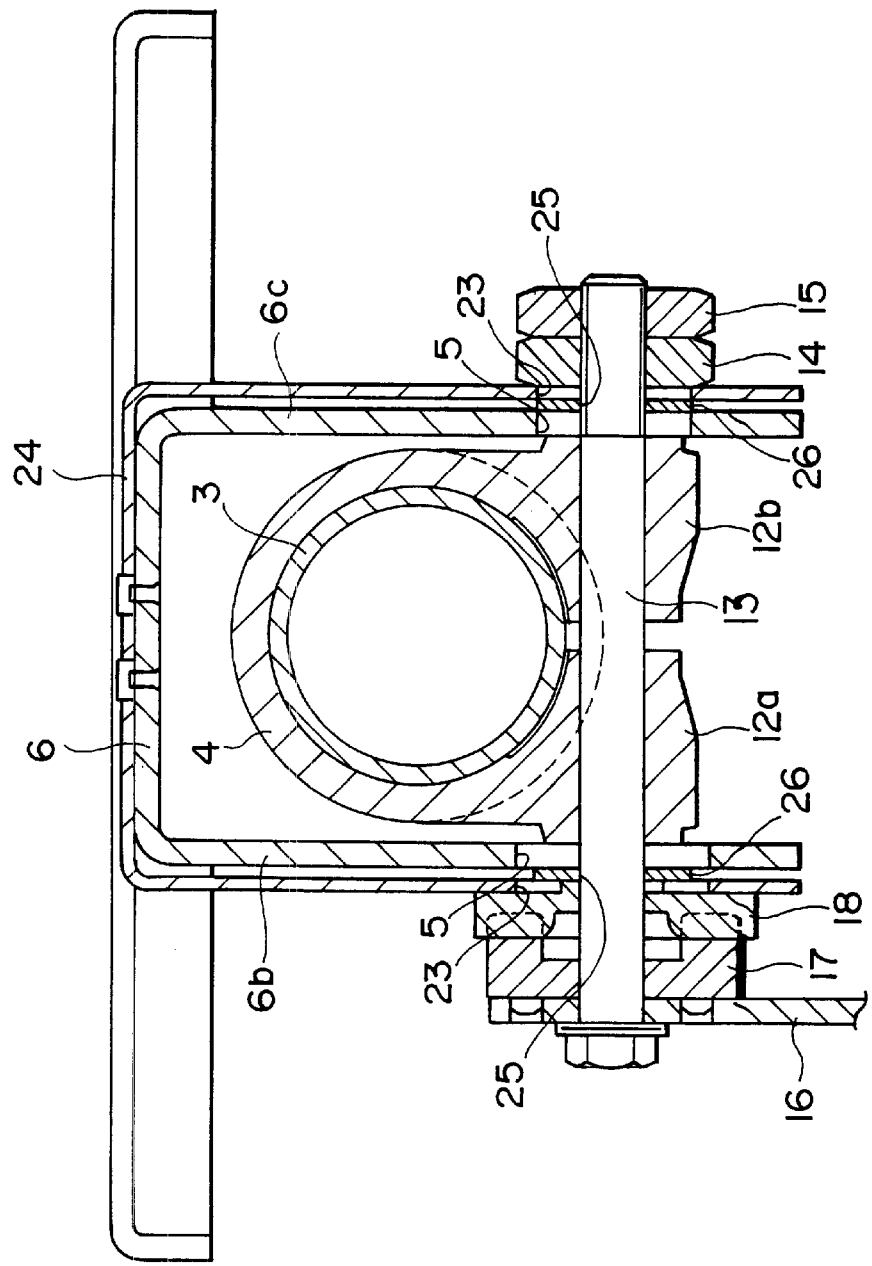
FIG. 14 is an enlarged cross-sectional view taken along the line F—F in FIG. 13.

FIG. 13 is a partial sectional view showing the principal components of the tilt telescopic type steering device for the car in the third embodiment of the present invention. FIG. 14 is an enlarged cross-sectional view taken along the line F—F in FIG. 13.

The lower-sided outer column 4 to which the upper-sided innercolumn 3 is slidably fitted, is provided with the outer jacket configuring integrally the couple of clamp members 12a, 12b on the rear side of the car. In the third embodiment, however, a position where the clamp members clamp the inner column, is under the lower-sided outer column 4.

As shown in FIGS. 13 and 14, areinforcing telescopic bracket 26 formed with grooves 25 for the telescopic adjustment is provided in a position where the clamp members fasten the inner column on the car rear side of the bracket 6, in order to increase a holding force in the telescopic direction. The telescopic bracket 26 is fixed to the inner column 3. Further, a reinforcing tilt bracket 24 having a tilt adjustment groove 23 is provided on an outer periphery of the bracket 6 to increase the holding force when tilted. The bracket 24 is fixed to the bracket 6.

In the third embodiment also, when making the tilt telescopic adjustment, the operation lever 16 is rotated and/or in a predetermined direction. Then, the first cam member 17 rotates simultaneously and engages with the bottom from the crest of the second cam member 18, and the second cam member 18 moves leftward in FIG. 15, thereby releasing the outer column 4 from being fastened by the car-body-sided bracket 6.

With this operation, when making the tilt adjustment, the fastening bolt 13 is moved along the tilt adjustment groove 5 (and the tilt adjustment groove 23 of the reinforcing tilt bracket 24), and the outer column 4 and the inner column 3 are tilted, thus making it possible to adjust the steering wheel (unillustrated) at a desired tilt angle.

When making the telescopic adjustment, the telescopic adjustment groove 25 moves along the fastening bolt 15, and the upper-sided inner column 3 is slid together with the upper shaft 1 in the axial direction with respect to the lower-sided outer column 4, whereby the steering wheel (unillustrated) can be adjusted to a desired position in the axial direction. When in the fastening process, the operation lever 16 is rotated in the opposite direction, and simultaneously the first cam member 17 rotates and engages with the crest from the bottom of the second cam member 18, with the result that the second cammember 18 moves rightward in FIG. 14. Then, the car-body-sided bracket 6 presses the outer column 4 with the fastening bolt 13 through the reinforcing tilt bracket 24 and the reinforcing telescopic bracket 26.

With this operation, the couple of these clamp members 12a, 12b move close to each other, and clamp the upper-sided inner column 3 so as to hold the same column 3. Thus, the upper-sided inner column 3 is clamped directly by the lower-sided outer column 4. With this configuration, even when the bending load acts on the steering wheel (not shown), the upper-sided inner column 3 neither moves nor oscillate slightly, whereby the rigidities of the two columns 3, 4 can be highly increased.

(Fourth Embodiment)

Figure 15:
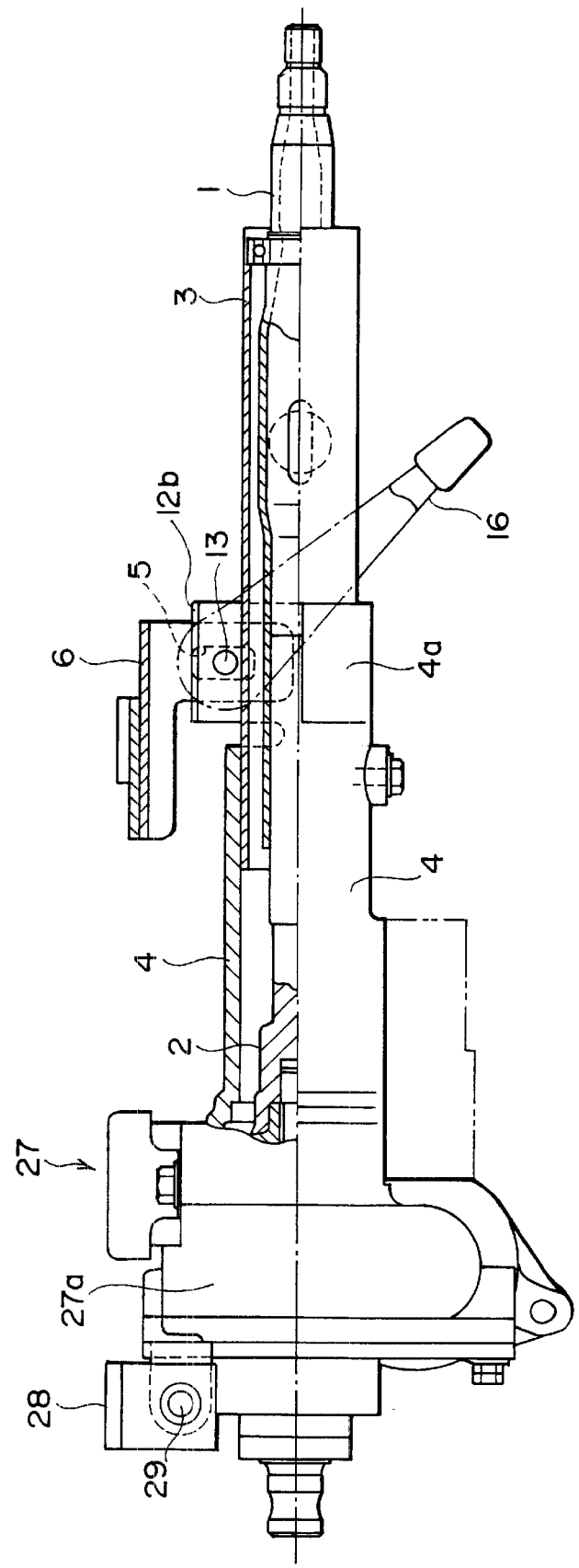
FIG. 15 is a longitudinal vertical sectional view showing a tilt telescopic type steering device for a car in a fourth embodiment of the present invention.

FIG. 15 is a longitudinal vertical sectional view showing the tilt telescopic type steering device for the car in a fourth embodiment of the present invention.

In the fourth embodiment, an electric power steering device 27 is provided. In the fourth embodiment, a gear box 27a of the electric power steering device 27 is formed integrally with the outer column 4, and is so supported as to be rockable about a tilt center pin 29 by a car-body-sided lower fitting bracket 28 at the front side end of the car. Further, the outer jacket configuring the couple of clamp members 12a, 12b (only the member 12b is shown) that are the same as those in the first embodiment, is integrally formed behind the outer column 4 integral with the gear box 27a. Other configurations are the same as those in the first through third embodiments discussed above.

The lower-sided outer column 4 is molded integrally with the gear box of the electric power steering device 27, but may also be formed separately.

In the fourth embodiment also, the operation lever 16 is rotated in the fasten-canceling or releasing direction, and the inner column 3 is released from being fastened by the clamp members, whereby the telescopic adjustment and the tilt adjustment can be made.

(Fifth Embodiment)

Figure 16:
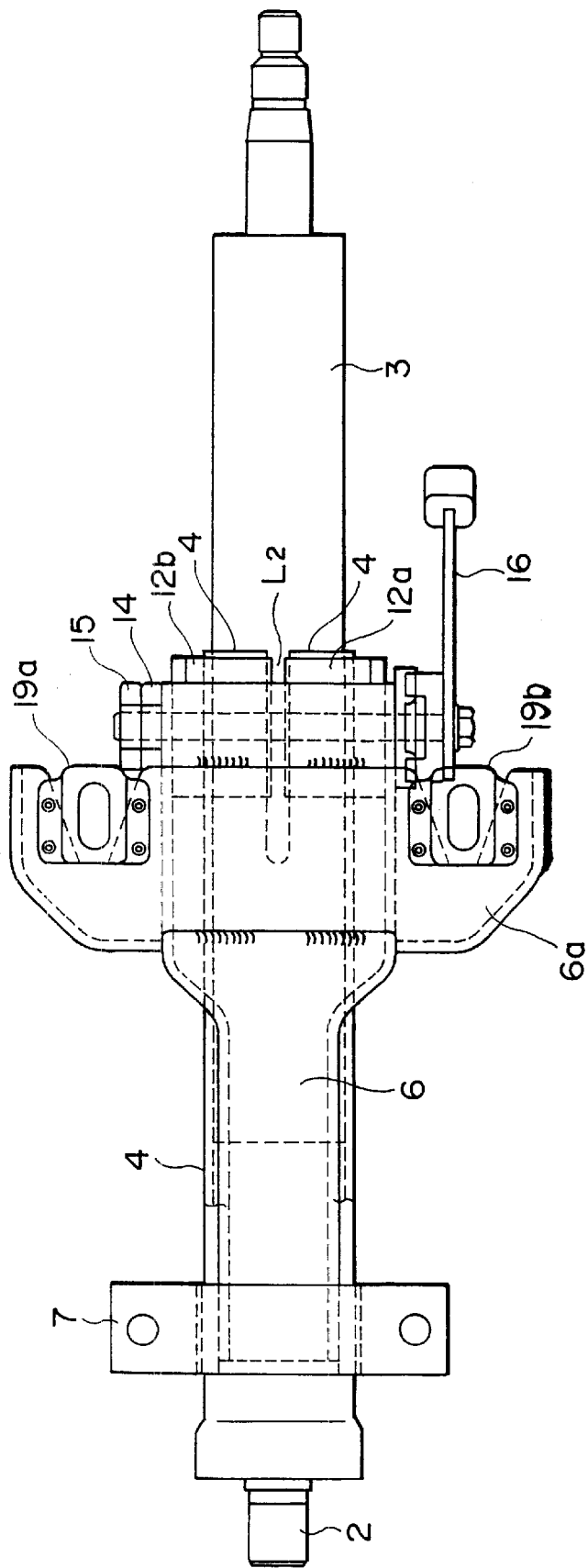
FIG. 16 is a plan view showing a tilt telescopic type steering device for a car in a fifth embodiment of the present invention.
Figure 17:
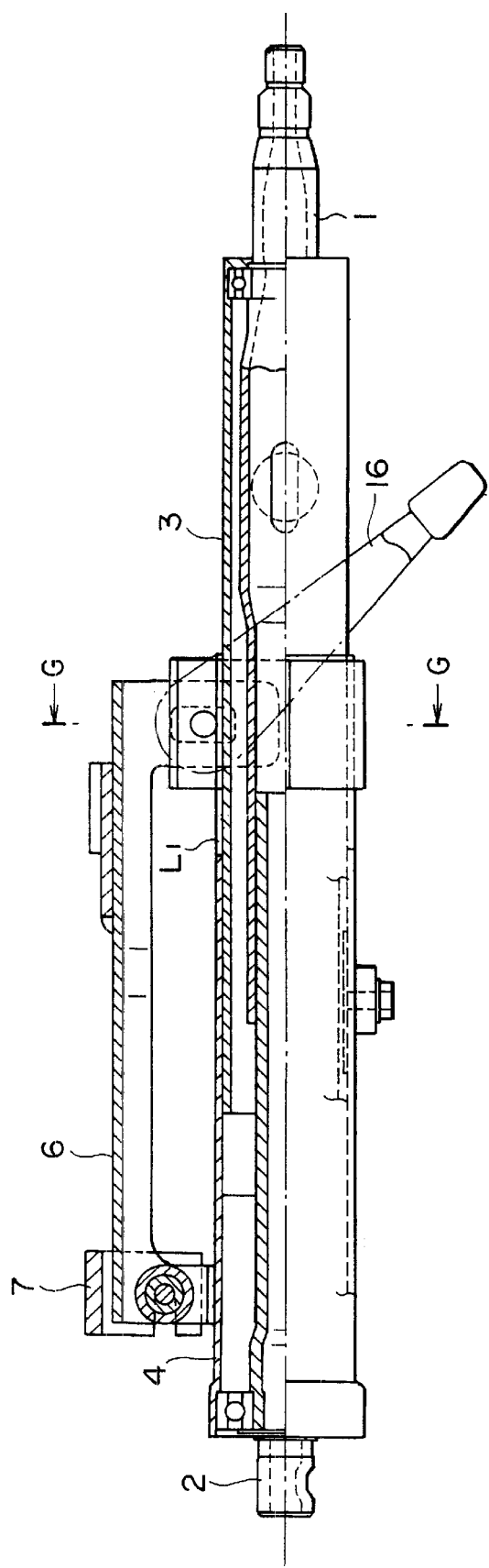
FIG. 17 is a longitudinal vertical sectional view showing the steering device shown in FIG. 16.
Figure 18:
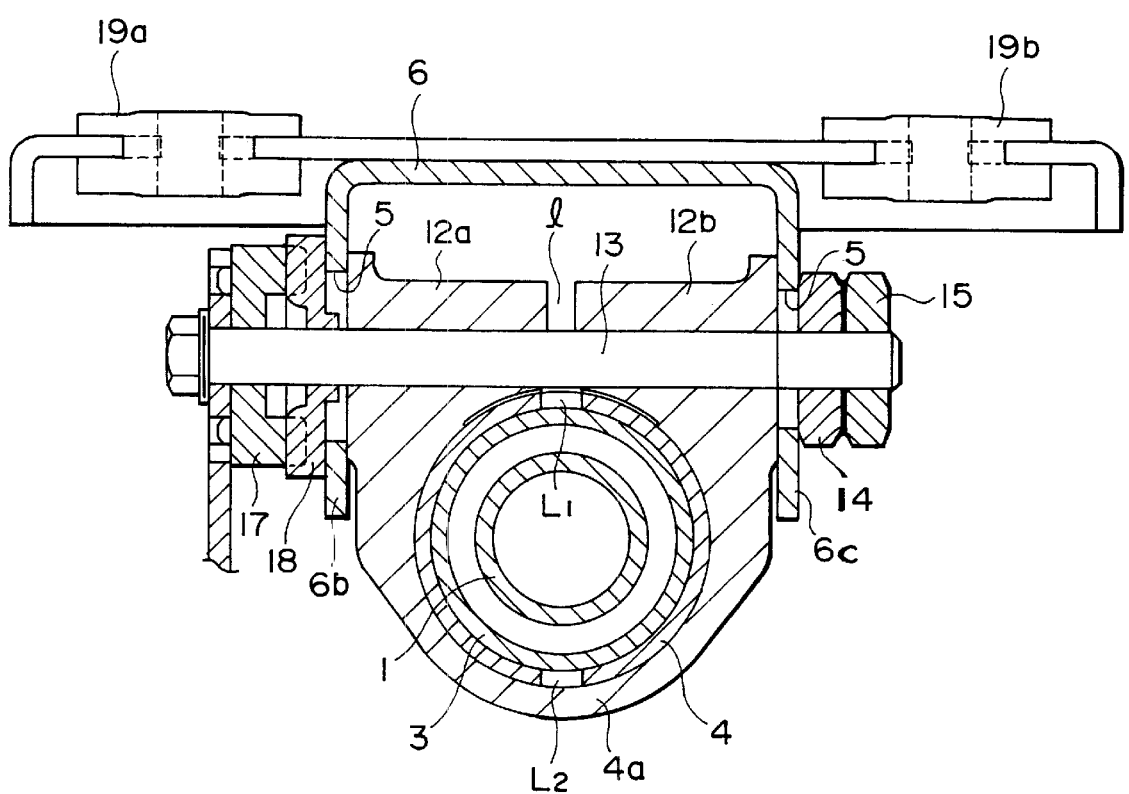
FIG. 18 is a cross-sectional view taken along the line G—G in FIG. 17.

FIG. 16 is a plan view of the tilt telescopic type steering device for the car in a fifth embodiment of the present invention. FIG. 17 is a longitudinal vertical sectional view of the steering device shown in FIG. 16. FIG. 18 is a cross-sectional view taken along the line G—G in FIG. 17.

The discussion on the fifth embodiment will be focused on configurations different from the first embodiment, wherein the same components as those in the first embodiment are just marked with the like numerals, or their repetitive explanations are omitted.

In the fifth embodiment, the outer column 4 is a separate member from the clamp members 12a, 12b and the outer jacket 4a. The lower-sided outer column 4 is formed with two pieces of slittings L1, L2 extending in the axial direction, which are formed facing to each other in the radial direction at a portion fitted to and overlapped with the front side end of the upper-sided inner column with at rear side end of the outer column 4.

The outer jacket 4a brought into contact with the outer periphery of the rear side end of the outer column 4 and making the clamp members 12a, 12b integral, is formed under the couple of clamp members 12a, 12b. The configurations and the structures of the clamp members 12a, 12b and the outer jacket 4a are the same as those in the first embodiment except that theses members are separate from the outer column 4.

In the fifth embodiment, the outer jacket 4a that integrates the couple of clamp members 12a, 12b thus formed, is disposed on the outer periphery of the outer column 4 on the outer peripheral side at the portion where the inner column 3 is overlapped with the outer column 4. Then, the outer jacket 4a fastens and fixes the outer column 4 directly the inner column 3 in a tilt adjustment position or in a telescopic adjustment position.

The configurations and operations other than described above in the fifth embodiment are the same as those in the first embodiment. The outer jacket 4a may be composed of castings such as an aluminum casting, a zinc casting, a magnesium-series casting and an iron-series casting. Then, the outer column 4 may be composed of a pipe material and a casting.

(Sixth Embodiment)

Figure 19:
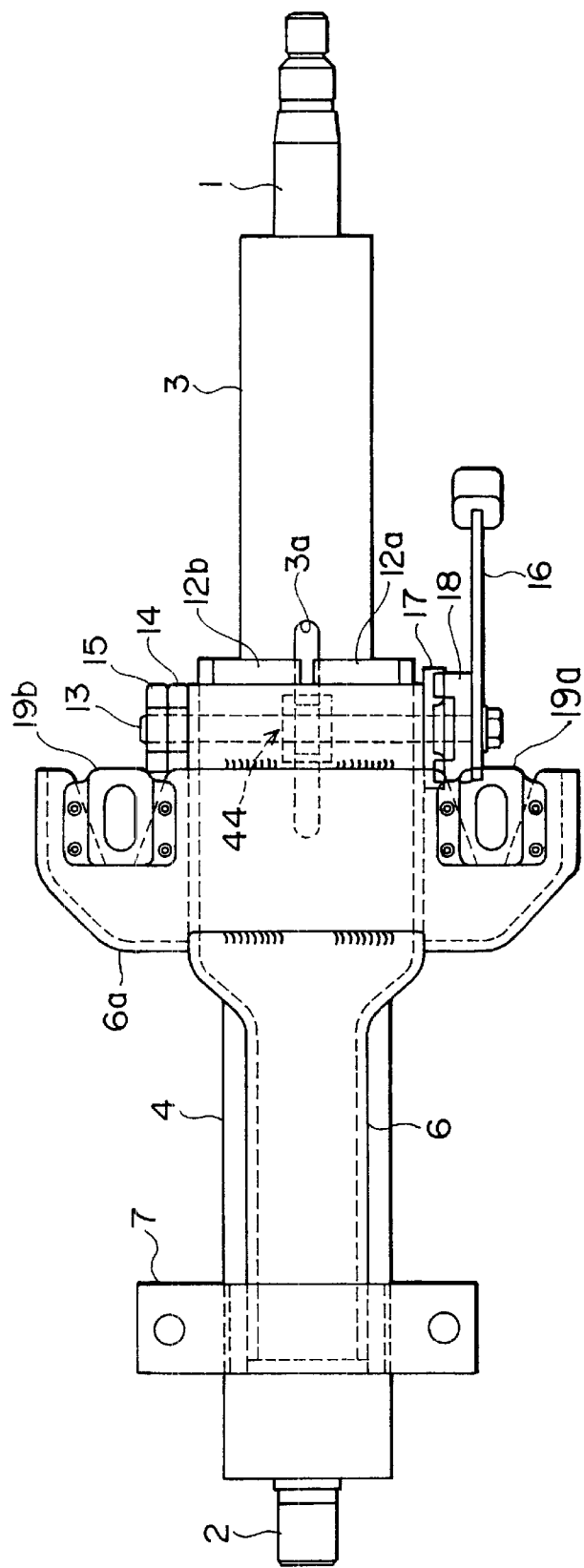
FIG. 19 is a plan view showing a tilt telescopic type steering device for a car in a sixth embodiment of the present invention.
Figure 20:
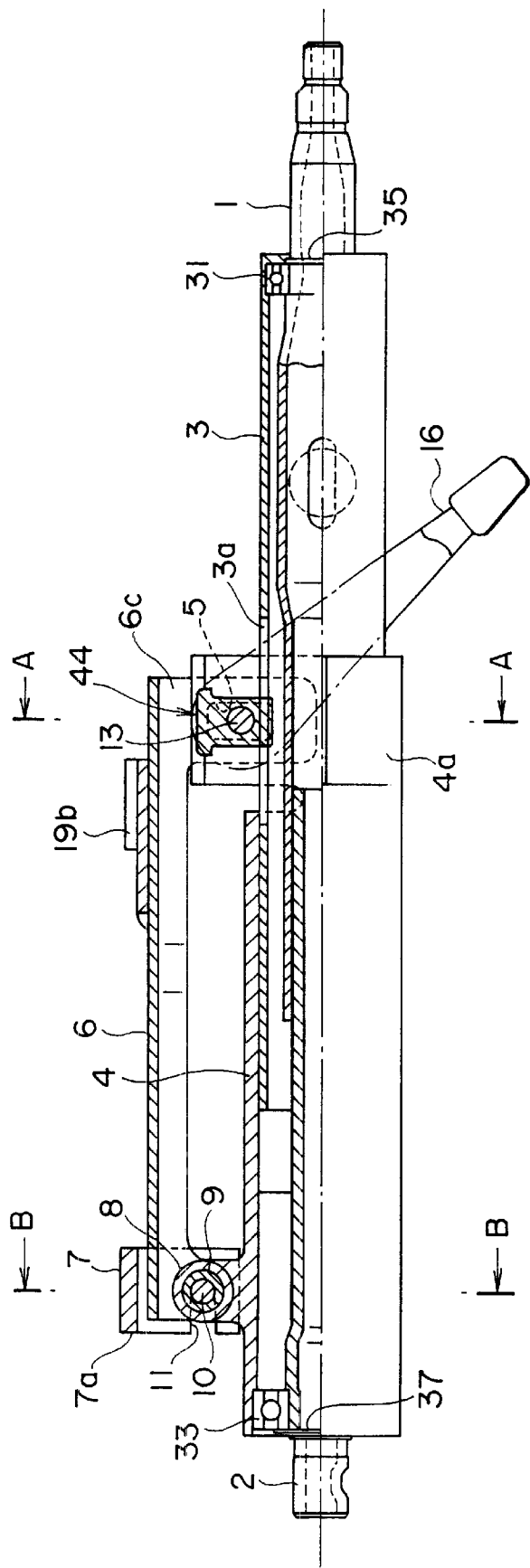
FIG. 20 is a longitudinal cross-sectional view of the steering device shown in FIG. 19.
Figure 21:
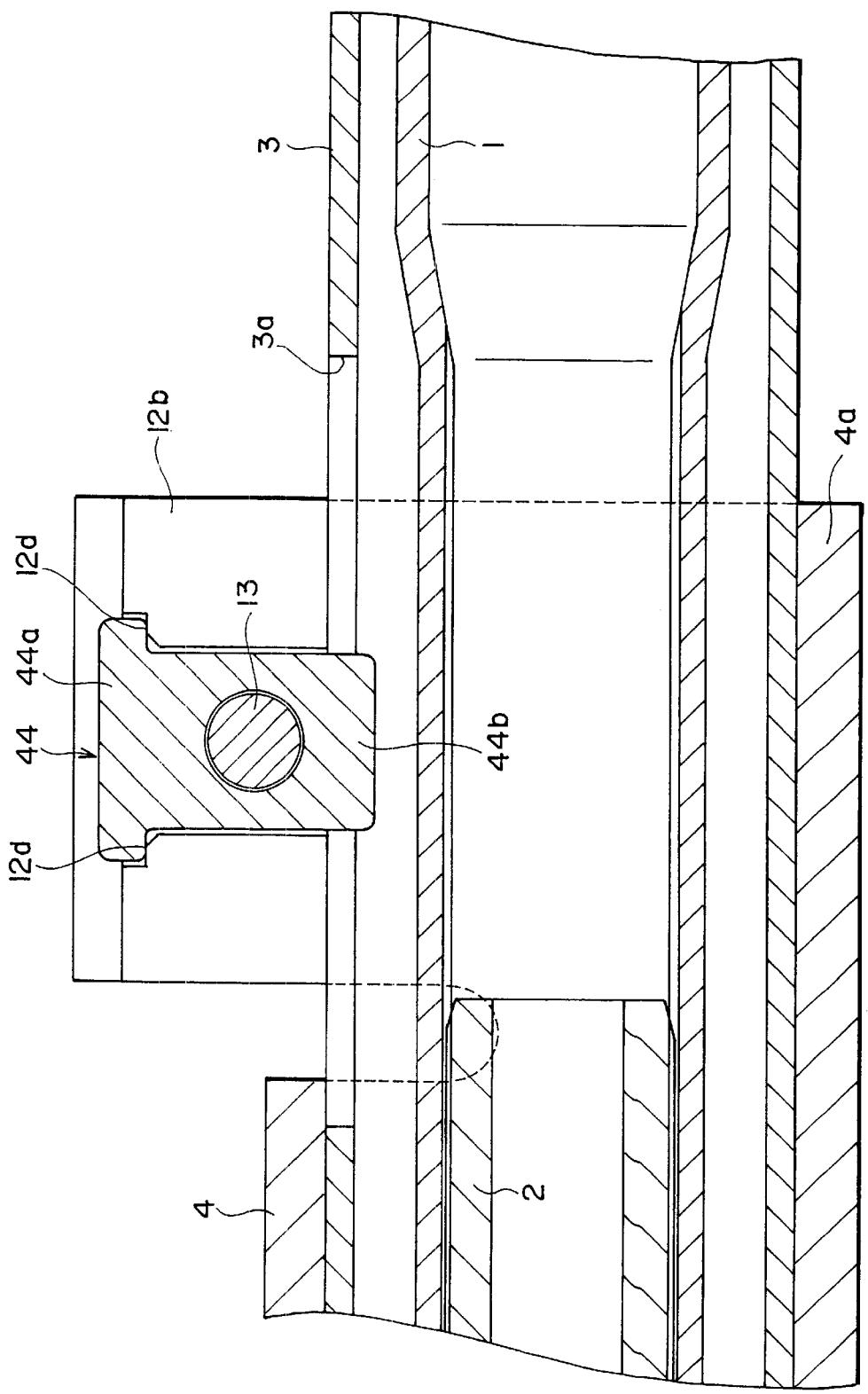
FIG. 21 is an enlarged longitudinal sectional view of principal portion of the steering device shown in FIG. 20.
Figure 22:
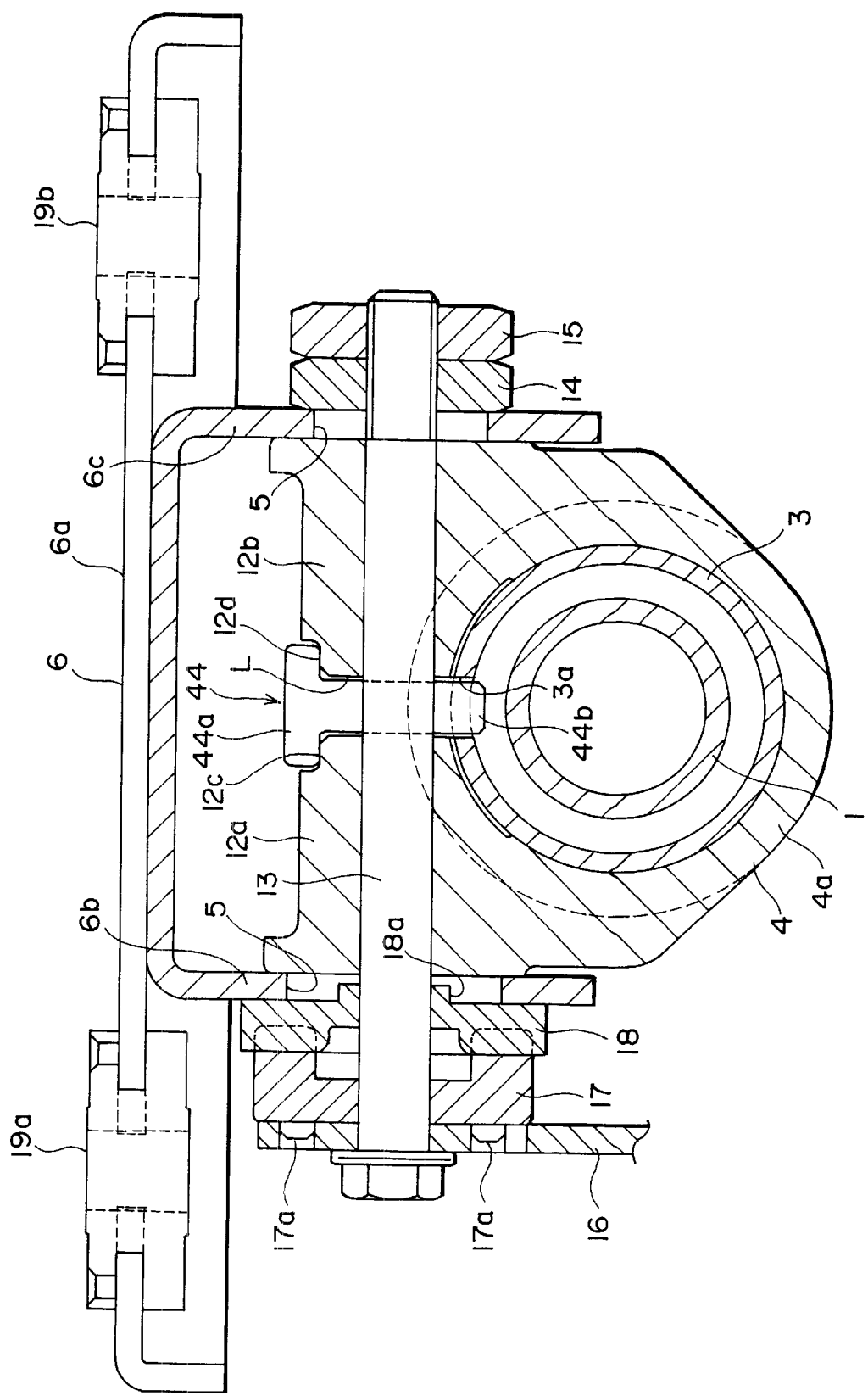
FIG. 22 is a cross sectional view taken along line A—A in FIG. 20.

FIG. 19 is a plan view of a tilt telescopic type steering device for a car in a sixth embodiment of the present invention. FIG. 20 is a longitudinal vertical sectional view of the steering device shown in FIG. 19. FIG. 21 is an enlarged vertical sectional view showing the principal components in enlargement of the steering device in FIG. 20. FIG. 22 is across-sectional view taken along the line A—A in FIG. 20. Other components are the same as those in the first embodiment, and hence their repetitive explanations are omitted.

Now, in the sixth embodiment, a stopper member 44 is interposed in the gap (slitting) L between the couple clamp members 12a, 12b. As shown in FIGS. 21 and 22, this stopper member 44 is integrally constructed of a head 44a placed on shoulders 12c, 12d formed respectively on the clamp members 12a, 12b, and a lower end shaft member 44b fitted into a slot 3a so formed in the inner column 3 as to extend in the axial direction. Further, a fastening bolt 13 (tilt bolt) is inserted through the stopper member 44 and the clamp members 12a, 12b. A screw portion of this fastening bolt 13 is screwed into a fastening nut 14 and a lock nut 15.

Thus, a shaft portion 44b of the stopper member 44 interposed in the gap L between the couple of clamp members 12a, 12b, is fitted into the slot 3a, extending in the axial direction, of the inner column 3. Therefore, the stopper member 44 functions as a stopper in the rotational direction (peripheral direction), and it follows that the two columns 3, 4 are held against the rotational movement not only by the friction but also mechanically. Accordingly, even when a very large torque is applied to the steering wheel (unillustrated), it does not happen that the outer column 4 and the inner column 3 rotate relatively.

Further, when in a telescopic sliding operation, the shaft portion 44b of the stopper member 44 is movable through inside the axially-extending slot 3a of the inner column 3 and brought into contact with a side edge of the axially-extending slot 3a, whereby the stopper member 44 becomes capable of functioning as a stopper in the axial direction with respect to the inner column 3 making the telescopic slide.

Further, in the sixth embodiment, the provision of the stopper does not lead to an intricacy of the molds and eliminates the necessity of working the screw thread in a post-process. Besides, the stopper has an extremely simple structure, thereby making it feasible to reduce the manufacturing costs.

Moreover, the fastening bolt (tilt bolt) 13 penetrating the couple of clamp members 12a, 12b further penetrates the stopper member 44. This configuration induces no possibility in which the stopper member 44 comes off. Further, the head 44a of the stopper member 44 comes into contact with the shoulders 12c, 12d of the clamp members 12a, 12b, and hence there is no possibility where the stopper member 44 itself rotates about the fastening bolt 13.

Furthermore, when executing the telescopic fastening process, as shown in FIG. 22, there exist the gaps between the stopper member 44, the clamp members 12a, 12b and the fastening bolt 13. Therefore, when the clamp members 12a, 12b are fastened by the fastening bolt 13, the stopper member 44 and the inner column 3 can be firmly clamped. Only the head 44a of the stopper member 44 and the shoulders 12c, 12d of the clamp members 12a, 12b are, however, kept in contact with each other.

The present invention is not limited to the embodiments discussed above and may be modified in a variety of forms.

As discussed above, according to the present invention, the couple of clamp members integral with or separate from the outer column are so provided as to embrace the inner column or the outer column. Besides, the fastening member forces the couple of clamp members to move close to each other, and the inner column or the outer column is embraced and clamped by the couple of clamp members. Accordingly, the inner column is thus directly clamped by the outer column. With this structure, even when the bending load acts on the steering wheel (i.e., when the steering wheel is wrenched in the up-and-down directions), the inner column neither moves nor oscillates slightly, and the rigidities of the two columns can be highly increased.

What is claimed is:

1. A steering device for a car, comprising:
    an upper steering shaft and a lower steering shaft telescopically connected to the upper steering shaft to be rotatable together;
    an inner column member for rotatably supporting therein an upper end of said upper steering shaft;
    an outer column member for rotatably supporting therein a lower end of said lower steering shaft, said outer column member having a unitary integral structure which comprises:
        a lower column portion which is extended over a certain length in an axial direction of the steering device to surround a substantial length of the lower shaft and which is formed with a fixing portion supported to a lower bracket as a car body structure member;
        an outer jacket portion continuous to an upper end of said lower column portion, the outer jacket portion having an inner peripheral surface extended over a certain length in the axial direction of the steering device and having an inner column embracing portion for embracing an outer peripheral surface portion of a lower end portion of the inner column member; and
        a pair of clamp portions extended upwardly from said column embracing portion and having inner side surfaces opposed to each other with a clearance therebetween and outer side surfaces to be in face-to-face relationship with respective inner side surfaces of a substantially inverse U-shaped upper bracket as a car body structural member; and
        a fastening mechanism for fastening said upper bracket and said pair of clamp portions so that said outer jacket portion firmly embraces and fixes said inner column member and is fixed to the upper bracket;
        whereby when said fastening mechanism is released a telescopic position is adjustable and when said fastening mechanism is fastened said steering device is fixed to said upper bracket.

2. A steering device for a car according to claim 1, wherein:
    said fixing portion of the lower column portion is pivotably supported to said lower bracket so that, when said fastening mechanism is released a tilt position of said steering device is adjustable.

3. A steering device for a car according to claim 1, wherein:
    said column embracing portion of the outer jacket portion is formed with an inner peripheral surface fitted on an outer peripheral surface of the inner column member to surround over more than 180° thereof.

4. A steering device for a car according to claim 1, wherein:
    said pair of clamp portions are formed with through-holes extended in a direction perpendicular to a direction parallel to said axial direction; and
    said fastening mechanism includes a bolt inserted through the through-holes of said clamp portions and means for engaging said bolt.

5. A steering device for a car, comprising:
    an upper steering shaft and a lower steering shaft telescopically connected to the upper steering shaft to be rotatable together;
    an inner column member for rotatably supporting therein an upper end of said upper steering shaft;
    an outer column member for rotatably supporting therein a lower end of said lower steering shaft, said outer column member extended over a certain length in an axial direction of the steering device to surround a substantial length of the lower shaft, formed with a fixing portion supported to a lower bracket as a car body structure member, and having an inner column embracing portion for embracing an outer peripheral surface portion of a lower end portion of the inner column member, the inner column embracing portion being formed with a slit extended in the axial direction; and an outer jacket member having a unitary integral structure which comprises an outer column embracing portion having an inner peripheral surface for embracing said outer column member and a pair of clamp portions extended upwardly from said outer column embracing portion and having inner side surfaces opposed to each other with a clearance therebetween and outer side surfaces to be in face-to-face relationship with respective inner side surfaces of a substantially inverse U-shaped upper bracket as a car body structural member; and a fastening mechanism for fastening said upper bracket and said pair of clamp portions of the outer jacket member so that said outer jacket member firmly embraces and fixes said outer column member and is fixed to the upper bracket;

whereby when said fastening mechanism is released a telescopic position is adjustable and when said fastening mechanism is fastened said steering device is fixed to said upper bracket.

6. A steering device for a car according to claim 5, wherein:

said fixing portion of the outer column member is pivotably supported to said lower bracket so that, when said fastening mechanism is released a tilt position of said steering device is adjustable.

7. A steering device for a car according to claim 5, wherein:

said outer column embracing portion of the outer jacket member is formed with an inner peripheral surface fitted on an outer peripheral surface of the outer column member to surround over more than 180° thereof.

8. A steering device for a car according to claim 5, wherein:

said pair of clamp portions are formed with through-holes extended in a direction perpendicular to a direction parallel to said axial direction; and said fastening mechanism includes a bolt inserted through the through-holes of said clamp portions and means for engaging said bolt.

* * * * *

(12) EX PARTE REEXAMINATION CERTIFICATE (10699th)

United States Patent
Ikeda et al.

(10) Number: US 6,467,807 C1
(45) Certificate Issued: Sep. 4, 2015

(54) STEERING DEVICE FOR CAR

(75) Inventors: Shuhei Ikeda, Maebashi (JP); Kenji Sato, Maebashi (JP); Katsumi Saito, Maebashi (JP); Sakae Matsumoto, Maebashi (JP)

(73) Assignee: NSK LTD., Shinagawa-Ku, Tokyo (JP)

Reexamination Request:
No. 90/013,488, Apr. 15, 2015

Reexamination Certificate for:
Patent No.: 6,467,807
Issued: Oct. 22, 2002
Appl. No.: 09/782,523
Filed: Feb. 14, 2001

(30) Foreign Application Priority Data

| Feb. 15, 2000 | (JP) | 2000-036936 |
| Apr. 4, 2000 | (JP) | 2000-102693 |
| Aug. 24, 2000 | (JP) | 2000-254210 |
| Oct. 12, 2000 | (JP) | 2000-312118 |

(51) Int. Cl.
*B62D 1/184* (2006.01)
*B62D 1/18* (2006.01)

(52) U.S. Cl.
CPC .................................... *B62D 1/184* (2013.01)

(58) Field of Classification Search
None
See application file for complete search history.

(56) References Cited

To view the complete listing of prior art documents cited during the proceeding for Reexamination Control Number 90/013,488, please refer to the USPTO's public Patent Application Information Retrieval (PAIR) system under the Display References tab.

*Primary Examiner* — Peter C English

(57) ABSTRACT

A steering device for a car comprises an inner column for rotatably supporting one end of a steering shaft, an outer column for rotatably supporting the other end of the steering shaft, in which the inner column is slidably fitted, a couple of clamp portions formed integrally with the outer column and each having an embracing surface for embracing the inner column, and a fastening mechanism for making the couple of clamp portions embrace and thus fasten the inner column by moving the couple of clamp portions close to each other. The steering shaft is moved in the axial direction by releasing the fastening mechanism so that a telescopic position of the steering shaft is adjustable.

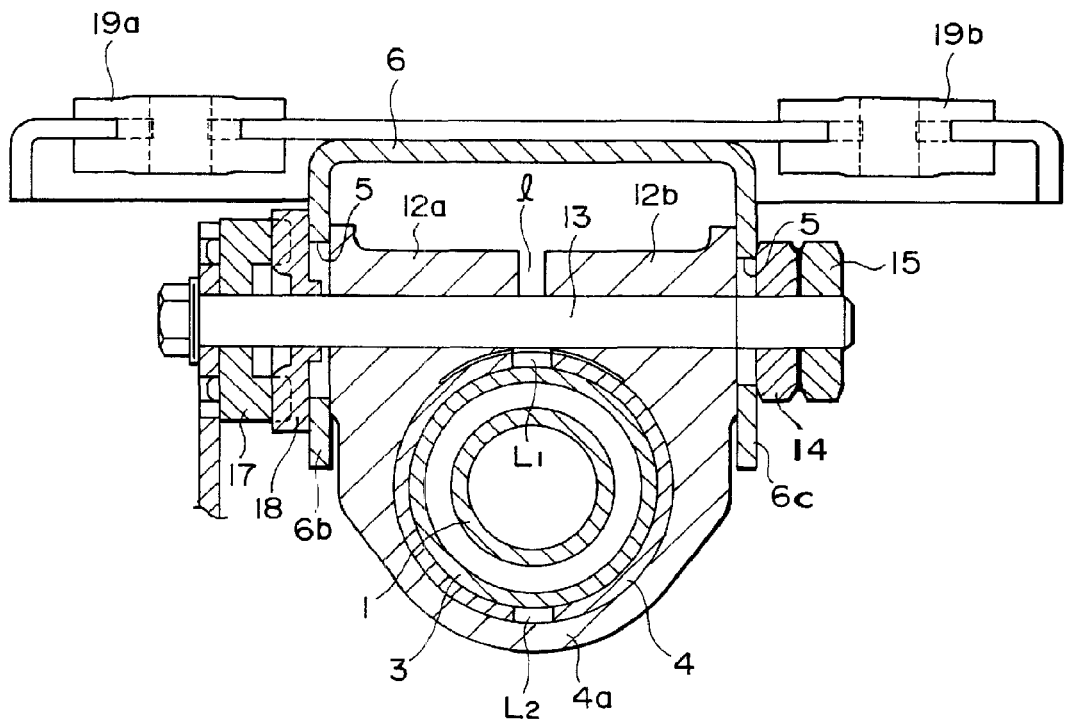

EX PARTE REEXAMINATION CERTIFICATE

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-4 is confirmed.

Claim 5 is determined to be patentable as amended.

Claims 6-8, dependent on an amended claim, are determined to be patentable.

5. A steering device for a car, comprising:
   an upper steering shaft and a lower steering shaft telescopically connected to the upper steering shaft to be rotatable together;
   an inner column member for rotatably supporting therein an upper end of said upper steering shaft;
   an outer column member for rotatably supporting therein a lower end of said lower steering shaft, said outer column member extended over a certain length in an axial direction of the steering device to surround a substantial length of the lower shaft, formed with a fixing portion supported to a lower bracket as a car body structure member, and having an inner column embracing portion for embracing an outer peripheral surface portion of a lower end portion of the inner column member, the inner column embracing portion being formed with a slit extended in the axial direction; and
   an outer jacket member having a unitary integral structure which comprises an outer column embracing portion having an inner peripheral surface for embracing said outer column member and a pair of clamp portions extended upwardly from said outer column embracing portion and having inner side surfaces opposed to each other with a clearance therebetween and outer side surfaces to be in face-to-face relationship with respective inner side surfaces of a substantially inverse U-shaped upper bracket as a car body structural member; and
   a fastening mechanism for fastening said upper bracket and said pair of clamp portions of the outer jacket member *so that the slit narrows in response to the fastening and* so that said outer jacket member firmly embraces and fixes said outer column member and is fixed to the upper bracket;
   whereby when said fastening mechanism is released a telescopic position is adjustable and when said fastening mechanism is fastened said steering device is fixed to said upper bracket.

* * * * *